United States Patent Office 3,615,109
Patented Oct. 26, 1971

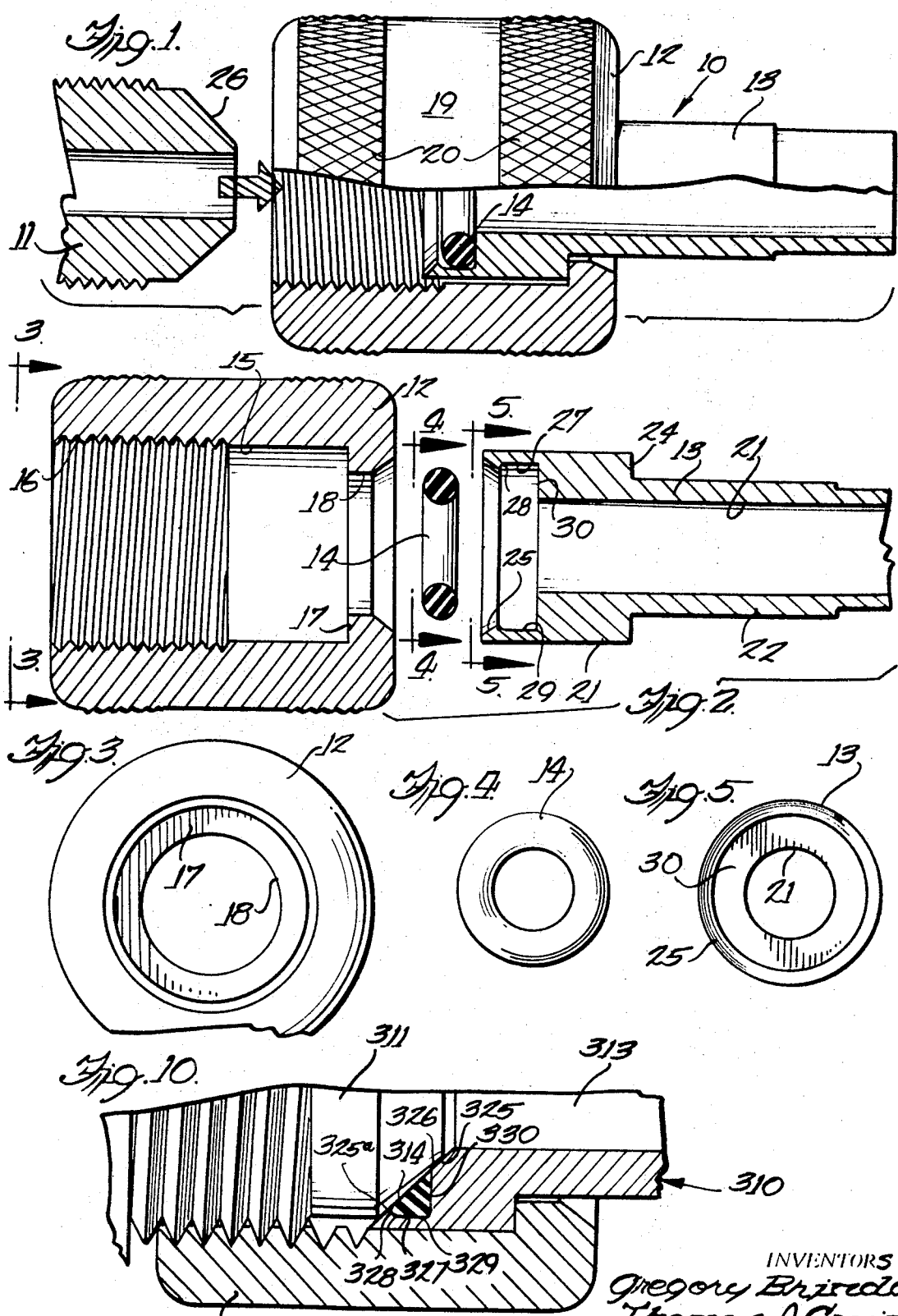

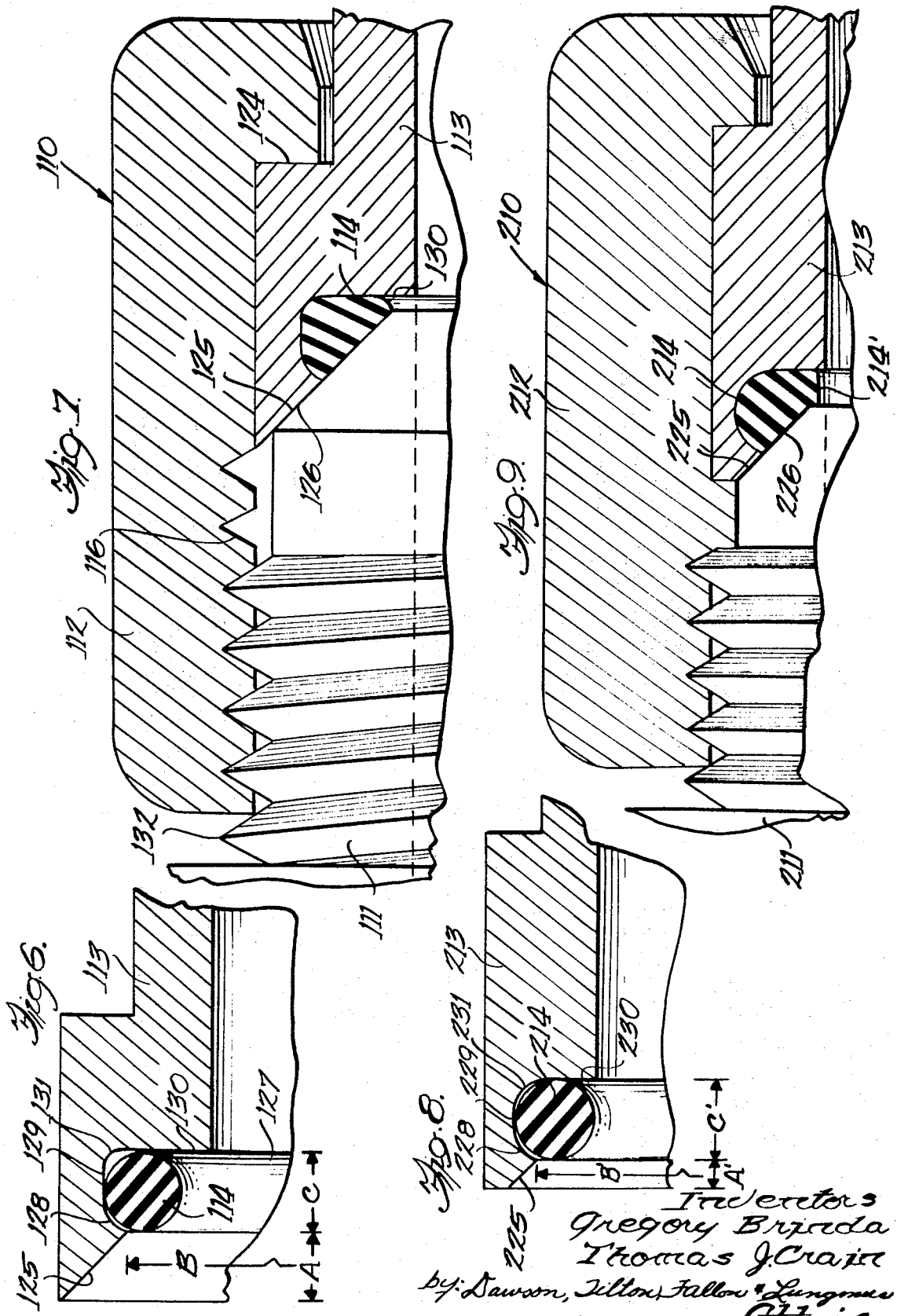

3,615,109
COUPLER FITTING FOR USE WITH BOTH VACUUM AND PRESSURE SYSTEMS
Gregory Brinda, 107 Long Ave., and Thomas J. Crain, 109 Long Ave., both of North Aurora, Ill. 60542
Filed Aug. 14, 1969, Ser. No. 849,962
Int. Cl. F16l *19/02*
U.S. Cl. 285—332.2
14 Claims

ABSTRACT OF THE DISCLOSURE

A coupler fitting for use with standard SAE flare fittings which will hold both pressure and vacuum. The coupler includes an internally threaded coupling nut which is adapted to threadedly engage the external threads of a male flare fitting and an elongated barb provided with a central bore therethrough. The interior of the forward end of the barb includes a frusto-conical inwardly and rearwardly flared stop surface which is adapted to mate with the flared end of the male flare fitting, and a circumferentially extending groove is provided in the barb adjacent the frusto-conical stop surface. The groove has a front wall which curves outwardly and rearwardly from the flared surface of the male fitting and a rear wall which extends radially inwardly beyond the innermost point of the front wall. An O-ring is snugly received by the groove and has a thickness substantially the same as the axial distance between the front and rear groove wall. The O-ring extends inwardly beyond an imaginary extension of the frusto-conical stop surface across the groove and is compressed into the groove by the flared end of the male flare fitting as the male flare fitting mates with the frusto-conical surface.

BACKGROUND

This invention relates to a coupler fitting, and more particularly, to a coupler fitting which is intended to hold both vacuum and pressure.

It is frequently desirable to provide quick connect and disconnect means for sealingly coupling pipe, tubing and the like. Many types of couplers are presently available which will satisfactorily join tubing which is intended to hold fluid under pressure. Also, couplers are available for joining tubing or the like which is intended to hold a vacuum. However, these couplers must frequently be wrench-tightened if substantial pressure or low vacuum is to be held, and the quick-connect feature is lost. No satisfactory finger-tight coupler has heretofore been available which will quickly and satisfactorily couple tubing for use with both pressure and vacuum applications.

Many pressure and vacuum systems utilize standard SAE flare tube fittings, and it is desirable to provide a coupling which may be used to connect tubing to such standard flare fittings. Further, once the coupling has been made, it is desirable that the coupling will hold both pressure and vacuum. For example, in the refrigeration industry a single line may be used for both pressurizing and evacuating without uncoupling the components of the line, and the couplers in the line should provide a seal against both pressure and vacuum.

SUMMARY

This invention provides a coupler which co-operates with standard male flare fittings to provide a seal against both pressure and vacuum. An effective seal may be obtained by a finger-tight connection, and the coupler can be quickly connected and disconnected without the use of wrenches or the like. The O-ring which provides the seal is carried within the coupler fitting and is thereby protected against nicking, scraping or the like which might interfere with the effectiveness of the seal.

DESCRIPTION OF THE DRAWING

The invention is explained in conjunction with illustrative embodiments shown in the accompanying drawing, in which—

FIG. 1 is an elevational view, partially broken away, of the coupler fitting about to engage a standard SAE male flare fitting;

FIG. 2 is an exploded sectional view of the coupler fitting of FIG. 1;

FIG. 3 is an end view of the nut taken along the line 3—3 of FIG. 2;

FIG. 4 is an end view of the O-ring taken along the line 4—4 of FIG. 2;

FIG. 5 is an end view of the barb taken along the line 5—5 of FIG. 2;

FIG. 6 is an enlarged fragmentary sectional view of one size of the coupler barb prior to engagement with a flare fitting;

FIG. 7 is a view similar to FIG. 6 showing the coupler sealingly engaging a flare fitting;

FIG. 8 is a view similar to FIG. 6 showing a different size coupler barb;

FIG. 9 is a view showing the coupler of FIG. 8 sealingly engaging a flare fitting; and FIG. 10 is a view similar to FIGS. 7 and 9 showing another embodiment of the coupler.

DESCRIPTION OF SPECIFIC EMBODIMENTS

Referring to FIGS. 1 and 2, the numeral 10 designates generally a coupler fitting which is about to engage a male flare fitting 11. The coupler 10 is seen to include a generally cylindrical nut 12, an elongated barb 13, and an O-ring 14.

The nut 12 includes a generally cylindrical interior surface or side wall 15 which is provided with internal threads 16 along a portion of the axial length thereof. A rear wall 17 extends radially inwardly from the cylindrical wall of the coupler and is provided with an opening 18 therethrough. The exterior surface 19 of the particular nut illustrated is also cylindrical and is provided with knurled portions 20 to aid in finger-tightening the nut. The exterior surface of the nut could also be of a standard rectangular or hexagonal shape if desired.

The barb 13 is provided with a central bore 21 and the barb includes an elongated connecting portion 22 and a radially enlarged sealing portion 23 rotatably received by the nut. The diameter of the connecting portion 22 is slightly less than the diameter of the opening 18 in the nut, and the coupler is assembled by inserting the connecting portion 22 through the opening 18. The radially enlarged sealing portion 23 provides an annular stop shoulder 24 which engages the rear wall 17 of the nut and prevents rearward withdrawal of the barb from the nut. It is to be understood that the rearward end of the connecting portion of the barb, which is not shown, may be provided with any conventional connecting means such as threads or the like for connecting the rearward end of the coupler to a conduit, port or the like.

In the embodiment illustrated in FIGS. 1 and 2, the interior of the forward end of the sealing portion 23 terminates in a generally frusto-conical stop surface 25 which is adapted to matingly engage the inwardly flared end 26 of the flare fitting 11. A somewhat annularly shaped groove or cavity 27 is provided in the interior of the sealing portion rearwardly of the stop surface 25 and includes a front wall portion 28 which curves outwardly and rearwardly from the seating surface 25, an intermediate wall portion 29, and a generally flat rear wall portion 30 which extends radially inwardly beyond the innermost point of the front wall portion. The rear wall portion extends generally transversely to the axis of the barb.

The O-ring 14 is snugly received by the groove 27 and extends radially inwardly beyond and imaginary extension of the frusto-conical stop surface 25 across the groove. Accordingly, a portion of the O-ring will be engaged by the flared surface 26 of the male fitting 11 as the flared surface of the male fitting mates with the flared stop surface 25.

Standard SAE flare fittings may be provided with a 37°, 45° or other angle flare, and the flare of the seating surface 25 will depend upon the flare of the particular SAE fitting with which the coupler is intended to be used. The O-ring is preferably a standard purchased part so that the initial cost of the coupler will not be excessive and so that the user may readily replace the O-ring if the original O-ring becomes damaged in some way.

The groove 27 is sized so that it is almost but not quite completely filled by the O-ring. The groove or cavity is narrower than standard O-ring cavities, and the axial dimension of the groove is preferably about 0.000 to about 0.011 inch larger than the thickness or axial dimension of the O-ring to minimize "pumping" action, thereby providing a better seal. Pumping action occurs when the line on which the coupler is used alternately holds pressure and vacuum. Once the O-ring is compressed by the male fitting, any movement of the O-ring is undesirable since the O-ring might thereby become unseated. Once the O-ring is unseated, it is difficult to get it to reseat while under vacuum. For this reason, it is desirable that the cavity 27 be completely filled by the compressed O-ring. Further, the cavity is sized so that the O-ring cross sectional area is not more than about 1% greater than the cross sectional are of the cavity under any tolerance conditions to minimize the possibility that the O-ring will be pinched as it is compressed by the male fitting. A further reason for having the cavity completely filled by the compressed O-ring is the shrinkage that is encountered with almost any rubber compound under vacuum due to outgassing, i.e., desorption or vaporizing of the surface.

FIGS. 6–9 illustrate the sealing action of two particular sizes of coupler fittings, each of which is intended for use with a particular size of male flare fitting.

Coupler fitting 10 which includes nut 112 and barb 113 is sized for use with 3/8 inch SAE male 45° flare fittings. The O-ring 114 is a standard commercially available neoprene O-ring having a durometer rating of 70 and AMS No. 3209. In its unflexed condition prior to insertion in the groove of the coupler, the O-ring has an outside diameter of about .504 inch, an inside diameter of .364±.005 inch, and a thickness of .070±.003 inch.

The stop surface 125 is also inclined at 45° to mate with the flare surface of the male fitting. The axial extent A of the stop surface 125 is about .060–.065 inch, and the innermost point of the stop surface has a diameter B of about .438 inch. The front wall 128 of cavity 127 curves outwardly and rearwardly along a radius of about .030 inch and merges smoothly with the intermediate wall portion 129. The intermediate wall portion 129 of the cavity extends generally axially and has a diameter of about .475–.480 inch. The intermediate wall portion merges smoothly with the rear wall portion 130 by means of a curved connecting wall portion 131 having a radius of about .015 inch.

The maximum axial distance C between the front wall 128 and the rear wall 130 is about .073–.078 inch, i.e., equal to or slightly greater than the thickness of the O-ring, and the outside diameter of the O-ring before insertion into the groove is slightly greater than the maximum diameter of the intermediate wall. The O-ring therefore engages the intermediate wall portion and is somewhat snugly received between the front and rear wall portions of the cavity since the O-ring thickness is substantially the same, but not greater than, the maximum axial distance between the front and rear wall portions. However, since the thickness of the O-ring is about .070 inch, the cross section of the O-ring has a radius of about 0.035 inch. The O-ring therefore has a greater curve than both the curved front wall 128 and the curved connecting portion 131, and the O-ring is spaced slightly from the curved portions of the cavity.

Referring to FIG. 7, threads 116 of the coupler 110 may engage the external threads 132 of the male flare fitting 111 and draw the surface 125 toward the flared surface 126 of the male fitting. The stop shoulder 124 of the barb 113 engages the rear wall of the nut and prevents withdrawal of the barb as the nut advances. When the coupler is sealingly engaged with the male fitting 111, the flared surface 126 of the male fitting engages and mates with the stop surface 125 of the coupler. The portion of the O-ring 14 which extends beyond the imaginary extension of the stop surface 125 across the groove is compressed into the cavity, completely filling the cavity and providing an effective seal against both pressure and vacuum. The metal-to-metal contact between the flared surface 126 of the male fitting and the stop surface 125 of the coupler provides a positive stop, thereby preventing over-compression of the O-ring and providing resistance against vibration. The coupler nut may be finger-tightened on the male fitting to engage the two flared surfaces and to compress the O-ring, and wrench tightening is not needed or desired. If a wrench is used, however, the positive stop provided by the mating of the flared surfaces prevents damage to the O-ring.

If the coupler and male fitting of FIG. 7 were holding a vacuum, the outside air would be trying to force its way inwardly past the O-ring. However, this pressure on the O-ring only serves to compress the O-ring further against the walls of the cavity 127 and the flared surface 126 of the male fitting, thereby making the seal even more effective. The rear wall 130 and the flared surface 126 extend toward each other forming a generally wedge-shaped or V-shaped opening in longitudinal cross-section into which the O-ring would be forced. The greater the vacuum, the more the O-ring would become seated within the wedge.

If the coupler and fitting of FIG. 7 were holding a fluid, either liquid or gas, under pressure, the fluid would attempt to escape outwardly past the O-ring. Again, this pressure would compress the O-ring against the cavity walls and the flared surface 126. In this case the front wall 128 and the flared surface extend toward each other to form a somewhat wedge-shaped configuration against which the O-ring is forced.

Since the O-ring is forced by the male flare fitting to fill the entire cavity, the coupler may alternately hold both vacuum and pressure without having to alter the connection between the coupler and the male fitting. The O-ring is compressed into the cavity and firmly held by the two generally wedge-shaped configurations formed by the male flared surface and the cavity walls, and pumping action of the O-ring is minimized or eliminated.

The coupler 210 with nut 212 and barb 213 in FIGS. 8 and 9 is sized for use with 1/4 inch standard SAE male flare fittings. The neoprene O-ring 214 is again a standard purchased part, having a durometer rating of 70 and AMS No. 3209. The outside diameter of the O-ring 214 is about .348 inch, the inside diameter is .208±.005 inch, and the thickness is again .070±.003 inch.

The stop surface 225 of the barb 213 is inclined at 45°, and the axial extent A' of the inclined surface is about .020–.025 inch. The diameter B' at the innermost point of the front wall 228 is about .305–.310 inch, and the maximum diameter of the intermediate wall portion 229 of the cavity 227 is about .340–.345 inch. The maximum axial dimension C' of the cavity is again about .073–.078 inch. The outwardly and rearwardly curved front wall portion 228 has a radius of about 1/32 inch, and the juncture portion 231 between the rear wall portion 230 and the intermediate wall portion 229 also has a radius of about 1/32 inch. The intermediate wall portion 229 therefore is provided with a somewhat flattened axially extending central portion, and there is a slight spacing between the O-ring and the curved portions of the cavity wall.

Referring to FIG. 9, when the coupler 210 is engaged with the male fitting 211, the flared surface 226 of the male fitting engages the flared stop surface 225 and compresses the O-ring 214, causing the O-ring to completely fill the cavity 227. The area of the flared surface 226 which engages the O-ring is not quite as large as that of the flared surface 126 of the ⅜ inch fitting 111, and the O-ring 214 therefore extends somewhat inwardly over the forward end of the flare fitting 211 as at 214'. However, with either size fitting, the same effective seal is obtained by virtue of the O-ring being forced to fill the entire cavity and being forced against a generally wedge-shaped configuration formed by the cavity and the flared surface of the male fitting. Also, in both size couplings, the positive stop provided by the seating surface prevents the flare fitting from over compressing the O-ring.

The spacing between the end of the flared surface 226 of the fitting 211 in FIG. 9 and the rear wall 230 is slightly greater than the corresponding spacing between the fitting 111 and the wall 130 in FIG. 7. However, the former spacing is not so great that the O-ring 214 might be forced inwardly out of the cavity when the coupler is holding vacuum.

Each of the flat rear walls 130 and 230 of the couplers 110 and 210, respectively, extends radially inwardly beyond the O-ring and retains the O-ring within the cavity as the O-ring is being compressed.

The coupler fittings illustrated in FIGS. 1–9 have the stop surface which engages the flared surface of the male fitting located forwardly of the groove in which the O-ring is inserted. However, the stop surface may also be located rearwardly of the groove as illustrated in FIG. 10. The purpose of the stop surface is to provide a positive contact with the male flare fitting, and a pressure or vacuum-tight seal is not necessarily obtained between the mating frusto-conical surfaces. Rather, the seal is obtained by the compression of the O-ring against the flared end of the male fitting and the walls of the groove. Accordingly the stop surface can be provided either forwardly or rearwardly of the sealing engagement of the O-ring with the male flare fitting.

Referring to FIG. 10, the coupler 310 includes a nut 312 and bar 313 which is shaped similarly to the barb previously described. The barb is provided with a groove 327 having an outwardly and rearwardly curved front wall portion 328, an intermediate wall portion 329, and an inwardly extending rear wall portion 330 which extends generally transversely to the axis of the barb, and O-ring 314 is received within the groove. Generally frusto-conical stop surface 325 provided by the interior surface of the barb is positioned rearwardly of the groove, and extends inwardly and rearwardly therefrom. The rear wall 330 extends outwardly from the forward end of the stop surface generally transverse to the axis of the barb.

In the particular barb illustrated in FIG. 10, the interior surface of the barb forwardly of the groove also provides a generally frusto-conical flared surface 325a, and the front wall portion 328 of the groove curves outwardly and rearwardly therefrom. The frusto-conical surfaces 325 and 325a are provided with the same flare, and both surfaces are adapted to mate with the flared end 326 of the male flare fitting 311, which compresses the O-ring 314, thereby providing the seal between the barb and the male fitting. The dimensions of the O-ring and the groove of the barb 313 are substantially the same as the dimensions of the corresponding parts of the couplers 110 and 210, depending upon the size of the particular male flare fitting intended to be used. Further, it will be understood that when the coupler fitting 310 is not engaging the male flare fitting, the O-ring 314 in its uncompressed state will extend inwardly beyond an imaginary extension of the stop surface 325 across the groove.

Although in the embodiment illustrated the forward end 325a of the interior surface of the barb 313 engages the flared surface of the fitting, it is to be understood that the forward end of the barb and the end of the front wall portion 328 may be sized and arranged so that they do not contact the flared surface 326 when the flared surface engages the stop surface 325. In other words, when the stop surface is positioned rearwardly of the groove, there may be a slight spacing between the flared surface of the male fitting and the barb portion forwardly of the groove just as in FIGS. 7 and 9 the barb portions rearwardly of the groove are spaced from the flare surface of the male fitting when the stop surface is positioned forwardly of the groove. It is to be understood, however, that the spacing will not be so great as to permit the O-ring to be forced out of the groove between the barb and the male fitting.

The coupler illustrated in FIG. 10 is similarly effective to seal both vacuum and pressure. The forward and rearward wall portions of the cavity again cooperate with the flared surface of the male fitting to provide generally V-shaped or wedge-shaped configurations into which the O-ring is compressed.

In all of the embodiments it will be appreciated that the O-ring is received by the groove provided in the interior surface of the barb and is therefore protected by both the nut and the sealing portions of the barb. The chances that the O-ring will be damaged or knicked is therefore minimized.

We have found that our couplers can be finger-tightened to hold pressures up to about 5000 p.s.i. and to hold vacuum down to about $10^{-6}$ torr.

While we have described particular coupler fittings for use with ⅜ inch and ¼ inch 45° flare fittings, it is to be understood that our invention is not so limited. Coupler fittings can be made in accordance with the invention for any size flare fitting. Further, coupler fittings can be provided for use with fittings having flares other than 45°. For example, if the male fitting had a flare of 37°, the seating surface of the coupler would be provided with a corresponding 37° flare.

While in the foregoing specification we have set forth detailed descriptions of specific embodiments of our invention for the purpose of illustration, it is to be understood that many of the details herein given may be varied considerably by those skilled in the art without departing from the spirit in scope of our invention.

We claim:

1. A coupler for use with an externally threaded standard SAE male flare fitting having an end inwardly flared at an angle of about 45° from the axis of the fitting, the coupler comprising a coupling nut adapted to threadedly engage the external threads of the flare fitting, said nut having a generally cylindrical internally threaded side wall and a rear wall provided with an opening therethrough, an elongated barb having a central bore therethrough, said barb having an axially rearwardly extending connecting portion and a radially enlarged sealing portion having a generally cylindrical external surface, said barb being rotatably received by said nut with the connecting portion extending through the rear wall opening, the sealing portion being engageable with the rear wall of the nut to prevent withdrawal of the barb from the nut through the rear wall opening, the interior surface of the forward end of the sealing portion including a generally frusto-conical inwardly and rearwardly flared surface extending at an angle of about 45° to the axis of the barb and adapted to mate with the inwardly flared end of the male flare fitting, the interior surface of the sealing portion being provided with a circumferentially extending groove adjacent the flared surface, the groove having a curved front wall portion, an intermediate wall portion and a rear wall portion, the curved front wall portion curving outwardly and rearwardly from the flared surface, the included angle between the flared surface and a tangent to the front wall portion of the groove at the intersection thereof with the flared surface being less than 90°, each of the front wall portion and the rear wall portion merging smoothly with the intermediate wall portion, an O-ring received by the groove and engaging the intermediate wall portion, the O-ring having a circular cross section and the thickness thereof being substantially the same as or less than the maximum axial distance between the front and rear groove wall portions, each of said front and rear groove wall portions merging smoothly with the intermediate wall portion along a radius less than the cross-sectional radius of the O-ring whereby said O-ring is spaced from the areas of merger between the intermediate wall portion and each of the front and rear wall portions, the rear wall portion of the groove extending radially inwardly beyond the O-ring, the O-ring extending inwardly beyond an imaginary extension of the frusto-conical flared surface across the groove whereby said O-ring may be compressed and forced into engagement with said areas of merger by the inwardly flared end of the male flare fitting as the male flare fitting mates with said frusto-conical flared surface.

2. The coupler of claim 1 in which the rear wall portion of the groove curves away from the intermediate wall portion and then extends generally transversely to the axis of the barb.

3. The coupler of claim 1 in which a portion of the intermediate wall portion of the groove extends parallel to the axis of the barb.

4. The coupler of claim 1 in which the outside diameter of the O-ring in an unflexed condition before insertion into the groove is greater than the maximum diameter of the intermediate wall portion, the O-ring engaging the intermediate wall portion when received by the groove.

5. The coupler of claim 1 in which the cross sectional area of the O-ring is substantially the same as the cross sectional area of the groove defined by the front, intermediate and rear wall portions thereof and the imaginary extension of the frusto-conical flared surface across the groove.

6. The coupler of claim 5 in which the cross section area of the O-ring is no more than about 1% greater than the cross sectional area of the groove.

7. The coupler of claim 1 in which the thickness of the O-ring is about 0.070 inch and the radius of the curved front wall portion of the groove is about 0.030 inch.

8. A coupler for use with an externally threaded standard SAE male flare fitting having an end inwardly flared at an angle of about 37° from the axis of the fitting, the coupler comprising a coupling nut adapted to threadedly engage the external threads of the flare fitting, said nut having a generally cylindrical internally threaded side wall and a rear wall provided with an opening therethrough, an elongated barb having a central bore therethrough, said barb having an axially rearwardly extending connecting portion and a radially enlarged sealing portion having a generally cylindrical external surface, said barb being rotatably received by said nut with the connecting portion extending through the rear wall opening, the sealing portion being engageable with the rear wall of the nut to prevent withdrawal of the barb from the nut through the rear wall opening, the interior surface of the forward end of the sealing portion including a generally frusto-conical inwardly and rearwardly flared surface extending at an angle of about 37° to the axis of the barb and adapted to mate with the inwardly flared end of the male flare fitting, the interior surface of the sealing portion being provided with a circumferentially extending groove adjacent the flared surface, the groove having a curved front wall portion, an intermediate wall portion and a rear wall portion, the curved front wall portion curving outwardly and rearwardly from the flared surface, the included angle between the flared surface and a tangent to the front wall portion of the groove at the intersection thereof with the flared surface being less than 90°, each of the front wall portion and the rear wall portion merging smoothly with the intermediate wall portion, an O-ring received by the groove and engaging the intermediate wall portion, the O-ring having a circular cross section and the thickness thereof being substantially the same as or less than the maximum axial distance between the front and rear groove wall portions, each of said front and rear groove wall portions merging smoothly with the intermediate wall portion along a radius less than the cross-sectional radius of the O-ring whereby said O-ring is spaced from the areas of merger between the intermediate wall portion and each of the front and rear wall portions, the rear wall portion of the groove extending radially inwardly beyond the O-ring, the O-ring extending inwardly beyond an imaginary extension of the frusto-conical flared surface across the groove whereby said O-ring may be compressed and forced into engagement with said areas of merger by the inwardly flared end of the male flare fitting as the male flare fitting mates with said frusto-conical flared surface.

9. The coupler of claim 8 in which the rear wall portion of the groove curves away from the intermediate wall portion and then extends generally transversely to the axis of the barb.

10. The coupler of claim 8 in which a portion of the intermediate wall portion of the groove extends parallel to the axis of the barb.

11. The coupler of claim 8 in which the outside diameter of the O-ring in an unflexed condition before insertion into the groove is greater than the maximum diameter of the intermediate wall portion, the O-ring engaging the intermediate wall portion when received by the groove.

12. The coupler of claim 8 in which the cross sectional area of the O-ring is substantially the same as the cross sectional area of the groove defined by the front, intermediate and rear wall portions thereof and the imaginary extension of the frusto-conical flared surface across the groove.

13. The coupler of claim 12 in which the cross section area of the O-ring is no more than about 1% greater than the cross sectional area of the groove.

14. The coupler of claim 8 in which the thickness of the O-ring is about 0.070 inch and the radius of the curved front wall portion of the groove is about 0.030 inch.

References Cited

UNITED STATES PATENTS

| | | | |
|---|---|---|---|
| 2,417,494 | 3/1947 | Hoof | 285—332.2 X |
| 2,568,232 | 9/1951 | Hamer | 285—332.2 X |
| 3,291,442 | 12/1966 | Cranage | 285—332.3 X |
| 904,673 | 11/1908 | Bideker | 285—332.3 |
| 2,523,995 | 9/1950 | Parmesan | 285—332.3 X |
| 2,646,996 | 7/1953 | Parmesan | 285—332.2 X |
| 2,971,782 | 2/1961 | Sparkman et al. | 285—332.3 |
| 3,385,614 | 5/1968 | Snyder | 285—332.3 X |
| 3,432,191 | 3/1969 | Ludeman | 285—332.3 X |

FOREIGN PATENTS

| | | | |
|---|---|---|---|
| 1,284,989 | 1/1962 | France | 285—333.2 |

THOMAS F. CALLAGHAN, Primary Examiner

U.S. Cl. X.R.

285—354